United States Patent
Ureche et al.

(10) Patent No.: US 10,078,747 B2
(45) Date of Patent: Sep. 18, 2018

(54) RESUMPTION OF LOGON ACROSS REBOOTS

(71) Applicant: Microsoft Technology Licensing, LLC, Redmond, WA (US)

(72) Inventors: Tony Ureche, Bellevue, WA (US); Saurav Sinha, Bellevue, WA (US); Pranav Kukreja, Seattle, WA (US); Ibrahim Mohammad Ismail, Bellevue, WA (US); Jonathan Schwartz, Seattle, WA (US); Nathan Ide, Bothell, WA (US); Yashar Bahman, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/748,222

(22) Filed: Jun. 23, 2015

(65) Prior Publication Data

US 2016/0378972 A1  Dec. 29, 2016

(51) Int. Cl.
| | |
|---|---|
| *G06F 7/04* | (2006.01) |
| *G06F 21/45* | (2013.01) |
| *G06F 21/31* | (2013.01) |
| *H04L 9/32* | (2006.01) |
| *H04L 29/06* | (2006.01) |

(52) U.S. Cl.
CPC .............. *G06F 21/45* (2013.01); *G06F 21/31* (2013.01); *H04L 9/3228* (2013.01); *H04L 63/08* (2013.01)

(58) Field of Classification Search
CPC ........ G06F 21/45; H04L 9/3228; H04L 63/08
See application file for complete search history.

(56) References Cited

U.S. PATENT DOCUMENTS

| | | | | |
|---|---|---|---|---|
| 7,533,178 | B2 * | 5/2009 | Henniger | H04L 67/14 709/227 |
| 7,660,880 | B2 | 2/2010 | Ting et al. | |
| 7,953,861 | B2 * | 5/2011 | Yardley | H04L 67/02 709/203 |
| 8,005,459 | B2 * | 8/2011 | Balsillie | H04L 63/083 455/410 |
| 8,589,733 | B2 * | 11/2013 | Di Domenico | G06F 11/1441 714/24 |
| 8,607,306 | B1 * | 12/2013 | Bridge | H04L 63/068 726/1 |
| 8,788,798 | B2 | 7/2014 | Iyigun et al. | |
| 2004/0073792 | A1 * | 4/2004 | Noble | G06F 21/35 713/168 |

(Continued)

OTHER PUBLICATIONS

"Winlogon Automatic Restart Sign-On (ARSO)", Available at: <<https://technet.microsoft.com/en-in/library/dn535772.aspx>>, Dec. 4, 2013, 4 pages.

(Continued)

*Primary Examiner* — Khoi V Le
(74) *Attorney, Agent, or Firm* — Arent Fox LLP

(57) ABSTRACT

In one embodiment, a user device may reestablish access to a user resource while forgoing use of a user credential during a system reboot. The user device may receive the user credential from a user during an initial login to access the user resource. The user device may create an ephemeral entropy to access the user resource. The user device may access the user resource using the ephemeral entropy.

20 Claims, 7 Drawing Sheets

(56) References Cited

U.S. PATENT DOCUMENTS

| | | | | |
|---|---|---|---|---|
| 2005/0060548 | A1* | 3/2005 | Allen | H04L 63/0428 713/172 |
| 2007/0282757 | A1 | 12/2007 | Pandya et al. | |
| 2009/0164774 | A1* | 6/2009 | Sherkin | H04L 9/3066 713/155 |
| 2010/0107241 | A1 | 4/2010 | Jaber et al. | |
| 2012/0084570 | A1* | 4/2012 | Kuzin | G06F 21/41 713/182 |
| 2012/0144179 | A1* | 6/2012 | Iyigun | G06F 9/4418 713/2 |
| 2012/0284786 | A1* | 11/2012 | Somani | H04L 63/0815 726/7 |
| 2012/0323717 | A1* | 12/2012 | Kirsch | G06Q 20/0855 705/26.1 |
| 2014/0108825 | A1* | 4/2014 | O'Loughlin | G06F 21/57 713/193 |
| 2014/0372740 | A1* | 12/2014 | Semenko | G06F 11/0766 713/2 |

OTHER PUBLICATIONS

"Cached and Stored Credentials Technical Overview", Available at: <<https://technet.microsoft.com/en-in/library/hh994565.aspx>>, Sep. 12, 2013, 4 pages.

"Automatic Log on Credentials: Reboot and Reconnect", Available at: <<https://www.bomgar.com/docs/content/customer-client/automatic-log-on-credentials.htm>>, Dec. 20, 2013, 3 pages.

Bavandla, Manikyam, "Automatically Resuming Windows Powershell Workflow Jobs at Logon", Available at: <<http://blogs.msdn.com/b/powershell/archive/2013/12/23/automatically-resuming-windows-powershell-workflow-jobs-at-logon.aspx>>, Dec. 23, 2013, 2 pages.

"Restoring Open Software after a Restart Event in Windows", Available at: <<http://superuser.com/questions/94943/restoring-open-software-after-a-restart-event-in-windows>>, Feb. 27, 2013, 4 pages.

"Windows Auto Login after Reboot", Available at: <<http://www.itprostuff.com/articles/windows-auto-login-after-reboot.html>>, Apr. 4, 2014, 3 pages.

"International Search Report and Written Opinion Issued in PCT Application No. PCT/US2016/038448", dated Aug. 30, 2016, 13 Pages.

"Windows 2000 Kerberos Authentication", Retrieved from <<https://web.archive.org/web/20040204182840/http://www.microsoft.com/WINDOWS2000/techinfo/howitworks/security/kerberos.asp>>, Jul. 9, 1999, 46 Pages.

"Second Written Opinion Issued in PCT Application No. PCT/US2016/038448", dated May 24, 2017, 8 Pages.

"International Preliminary Report on Patentability Issued in PCT Application No. PCT/US2016/038448", dated Sep. 6, 2017, 7 Pages.

\* cited by examiner

300

RESUMPTION OF LOGON ACROSS REBOOTS

BACKGROUND

A user may use a computing device to access a number of user resources. A user resource is a computing resource that allows a user to perform a computing activity. A user resource may be a device resource located in the computing device or a network resource that the computing device may access via a data network. The computing device may control access to the user resource via the use of a credential, such as a password, a biometric credential, a smartcard, a pair of asymmetric keys. The user may input a credential to the computing device to access the user resource.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to a user device reestablishing access to a user resource while forgoing use of a user credential during a system reboot. The user device may receive the user credential from a user during an initial login to access the user resource. The user device may create an ephemeral entropy to access the user resource. The user device may access the user resource using the ephemeral entropy.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
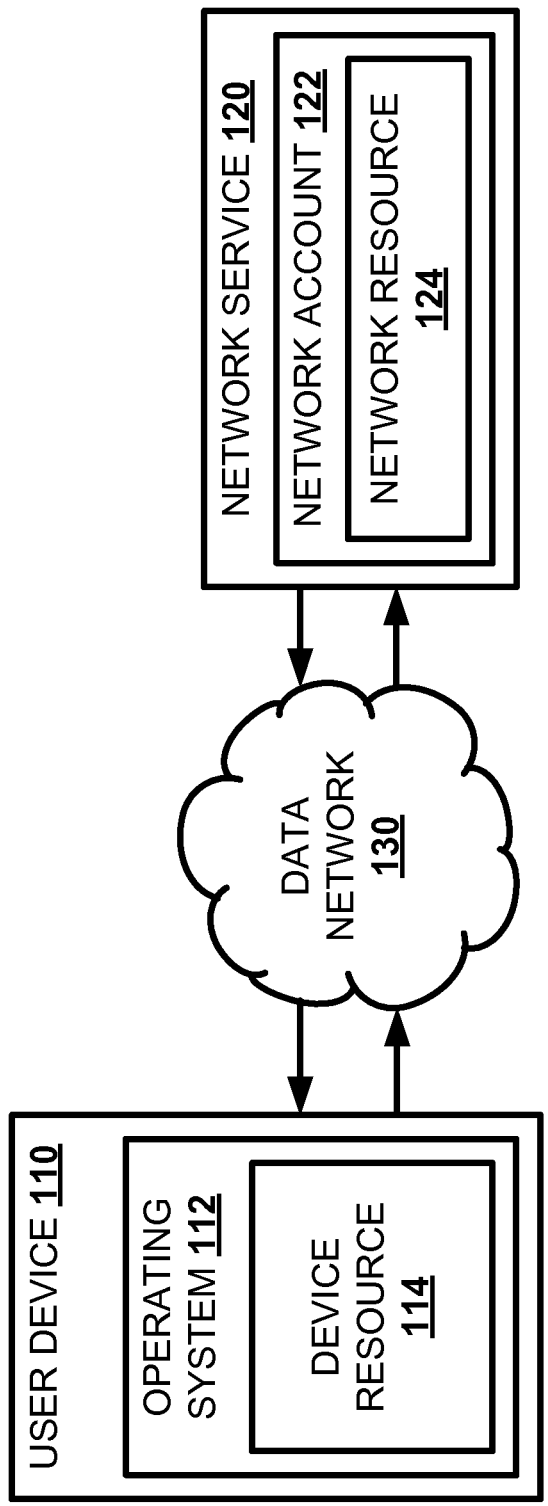
FIG. 1 illustrates, in a block diagram, one embodiment of a computing network.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a user device, a computer device, or a machine-implemented method.

In one embodiment, a user device may reestablish access to a user resource while forgoing use of a user credential during a system reboot. The user device may receive the user credential from a user during an initial login to access the user resource. The user device may decrypt a credential-protected key to produce a data protection key. The user device may create an ephemeral entropy to access the user resource. The user device may encrypt the data protection key with the ephemeral entropy to produce an entropy-protected key. The user device may decrypt the entropy-protected key after a system reboot to produce the data protection key. The user device may access the user resource with the data protection key acquired using the ephemeral entropy.

For network oriented accounts, such as an e-mail account or a cloud storage service account, a user device may use the user credentials to encrypt cached information of the user, such as authentication tokens, connection information, and state data. Upon an initial login, the user provides a user credential that the user device uses to decrypt the cached information. The cached information may include a data protection key. The data protection key may unlock any data encrypted to the user, such as passwords to various sites or authentication tokens for various services. Applications using a user's passwords and tokens may use the data protection key to decrypt this sensitive information. Since the data protection key is encrypted to a user credential, the user device may restrict access to the sensitive information to a particular user with knowledge of the user credential.

The user may log on with different types of credentials, such as passwords, smart cards, biometric data, or asymmetric keys. The user device may protect the cached information with each user credential. The user device may then unlock the data protection key with the user credential. During the logon session of the user, the user device may update the data protection key for each type of credential.

For a password, the data protection key may encrypt a derivative of the password, with the derivative of the password protecting the data protection key. For an asymmetric key pair, the public portion of the key pair may encrypt the data protection key to be decrypted by the private portion. During a password logon session, upon a data protection key change, the user device may re-encrypt the new key with the derivative of the password and the password derivative with the new key. Similarly, the user device may re-encrypt the new key with the public portion of the asymmetric key pair. During an asymmetric key pair credential logon session, the user device may use the previous data protection key to decrypt the password derivative. The user device may then use the new data protection key to re-encrypt the password derivative and the password derivative to encrypt the new data protection key. The user device also may encrypt the data protection key with the public portion of the asymmetric key. Thus, the next time the user logs on with either type of credential, the same updated data protection key may be available. For password based credentials, the user device may use the password derivative to decrypt the data protection key. For asymmetric key based credentials, the user device may use the private portion to decrypt the same data protection key.

For credential free resumption of the logon across boots, the user device may generate an ephemeral entropy to encrypt a data protection key decrypted by the actual credential with the ephemeral entropy. The ephemeral entropy is a random token generated to last for only a limited period of time, such as a single use. The user device may encrypt the ephemeral entropy with the data protection key. The user device may write the ephemeral entropy to a secure location, such as a trusted platform module. When the user device reboots, the user device may read the ephemeral entropy to decrypt the data protection key to unlock any sensitive information usable to access a user resource without using the actual user credential.

FIG. 1 illustrates, in a block diagram, one embodiment of a computing network 100. A user device 110 may execute an operating system 112 to access a user resource. The operating system 112 may use a user credential to access a device resource 114, such as a software application or a stored data file. The user device 110 may use the operating system 112 or an application resident on the operating system to access a network service 120 via a data network connection 130. The network service 120 may have a specific network account 122 assigned to the user owning the user device 110. The network account 122 may protect a network resource 124 with a user credential. The operating system 112 may use a user credential to access the network account 122 to access the network resource 124, such as an e-mail account, online data storage, a social network service, a software as a service (SaaS), or other network service. The network service 120 may be implemented on a single network server or a distributed set of network servers, such as a server farm. The data network connection 130 may be an internet connection, a wide area network connection, a local area network connection, or other type of data network connections.

Figure 2:
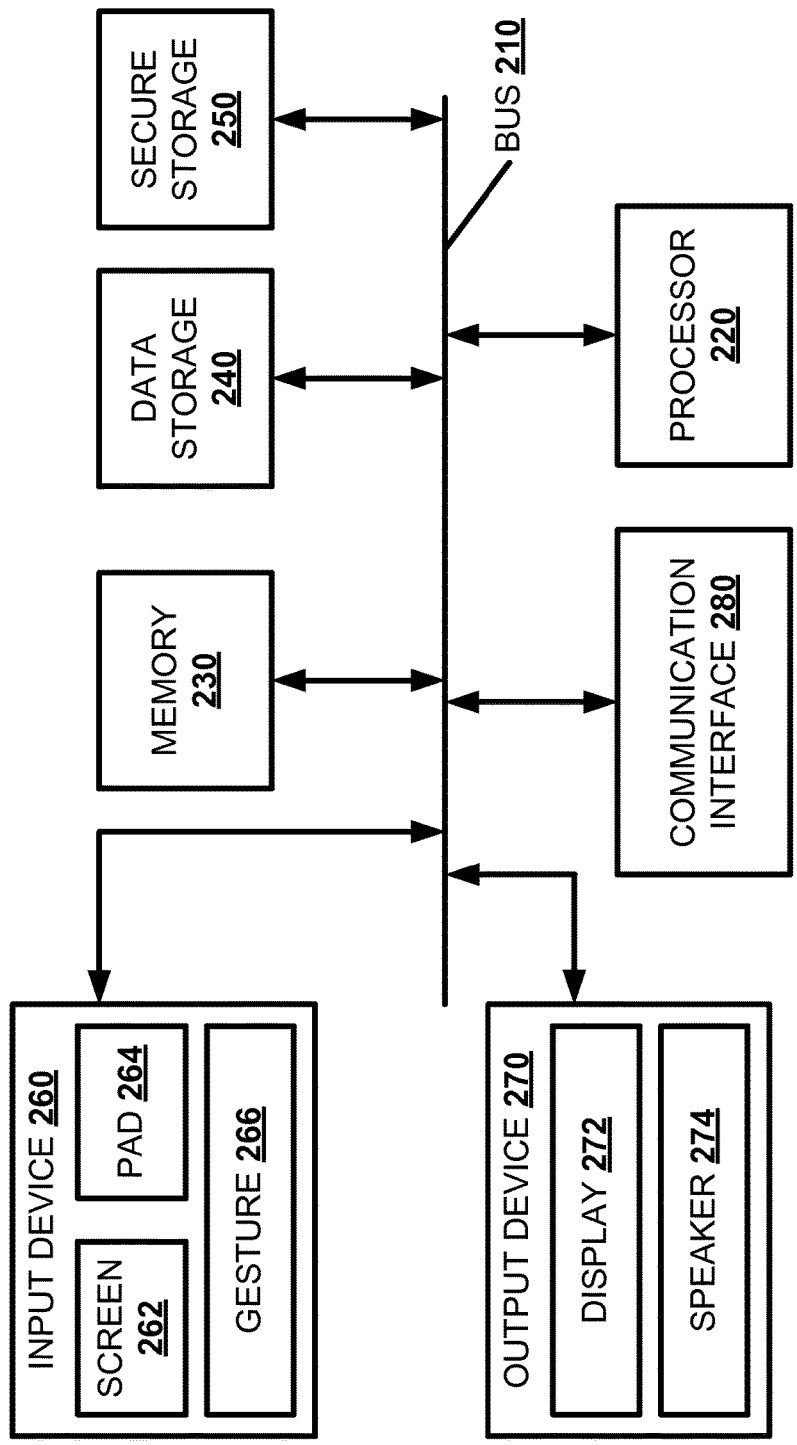
FIG. 2 illustrates, in a block diagram, one embodiment of a computing device.

FIG. 2 illustrates a block diagram of an exemplary computing device 200 which may act as a user device or a network server for a network service. The computing device 200 may combine one or more of hardware, software, firmware, and system-on-a-chip technology to implement a user device or a network server for a network service. The computing device 200 may include a bus 210, a processing core 220, a memory 230, a data storage 240, a secure data storage device 250, an input device 260, an output device 270, and a communication interface 280. The bus 210, or other component interconnection, may permit communication among the components of the computing device 200.

The processing core 220 may include at least one conventional processor or microprocessor that interprets and executes a set of instructions. The processing core 220 may be configured to create an ephemeral entropy usable to access the user resource without the use of a user credential. The processing core 220 may be further configured to access the user resource using the ephemeral entropy. The ephemeral entropy may be associated exclusively with a user device so that just that user device may use the ephemeral entropy. The ephemera entropy may be associated exclusively with a specific user of the user device so that the user device may use the ephemeral entropy to encrypt a data protection key for the access information for just the user. The ephemeral entropy may be limited to a single use, so that after the ephemeral entropy has decrypted the data protection key, the ephemeral entropy dissipates.

The processing core 220 may be further configured to protect the user resource with a data protection key. The processing core 220 may also be configured encrypt the data protection key with a user credential to produce a credential-protected key at logoff. The user credential may be a password, a biometric credential, a smartcard, and a pair of asymmetric keys. The logoff may be instigated by the user or initiated upon expiration of a timer. The processing core 220 may be additionally configured to decrypt the credential-protected key to produce a data protection key.

The processing core 220 may be configured to encrypt a data protection key with an ephemeral entropy to produce an entropy-protected key. If the processing core 220 updates the data protection key, the at least one processor may be further configured to update the entropy-protected key, possibly by encrypting the new data protection key with the ephemeral entropy. The processing core 220 also may be configured to decrypt an entropy-protected key with the ephemeral entropy to produce a data protection key.

The processing core 220 may be configured to set a capture schedule for a capture of a system state based on a device form factor. The processing core 220 may further be configured to schedule capturing a system state of the user device for after a user logon or prior to a system reboot. The processing core 220 also may be configured to capture a system state for the user device prior to a system reboot. The processing core 220 additionally may be configured to protect a system state for the user device with a data protection key. The processing core 220 then may be configured to reset a system state for the user device upon a system reboot.

The memory 230 may be a random access memory (RAM) or another type of dynamic data storage that stores information and instructions for execution by the processor 220. The memory 230 may also store temporary variables or other intermediate information used during execution of instructions by the processor 220. The memory 230 may be configured to store a system state for the user device prior to a system reboot.

The data storage device 240 may include a conventional ROM device or another type of static data storage that stores static information and instructions for the processor 220. The data storage device 240 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage device 240 may store a set of instructions detailing a method that when executed by one or more processors cause the one or more processors to perform the method. The data storage device 240 may also be a database or a database interface for storing a data protection key as well as access data for a user resource. The data storage device 240 may be configured to store a system state for the user device prior to a system reboot.

The secure data storage device 250 may provide additional protections for when storing sensitive data, such as the access data and a data protection key. The secure data storage device 250 may be a trusted platform module. The secure data storage device 250 may be configured to store an entropy-protected key or an ephemeral entropy in a secure location.

The input device 260 may include one or more conventional mechanisms that permit a user to input information to the computing device 200, such as a keyboard, a mouse, a voice recognition device, a microphone, a headset, a touch screen 262, a touch pad 264, a gesture recognition device 266, etc. The input device may be configured to receive a user credential from a user during an initial login to access a user resource. The output device 270 may include one or more conventional mechanisms that output information to the user, including a display screen 272, a printer, one or more speakers 274, a headset, a vibrator, or a medium, such as a memory, or a magnetic or optical disk and a corresponding disk drive.

The communication interface 280 may include any transceiver-like mechanism that enables computing device 200 to communicate with other devices or networks. The communication interface 280 may include a network interface or a transceiver interface. The communication interface 280 may be a wireless, wired, or optical interface. The communication interface 280 may connect to the data network to allow an operating system or other application to access a network service.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the data storage 240, or from a separate device via the communication interface 270.

Figure 3:
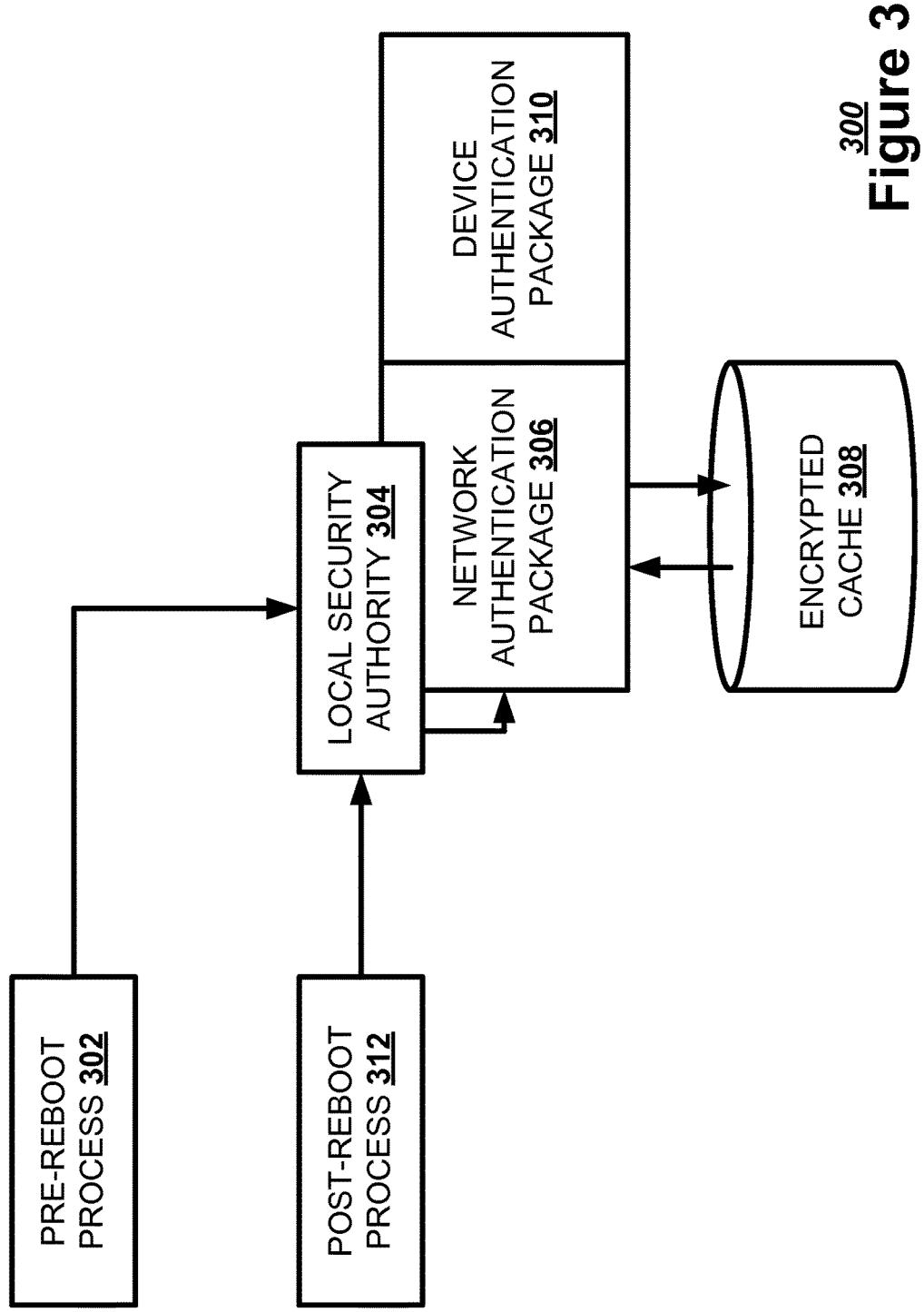
FIG. 3 illustrates, in a block diagram, one embodiment of a user device architecture.

FIG. 3 illustrates, in a block diagram, one embodiment of a user device architecture 300. The user device may execute a pre-reboot trusted computing base process module 302. The pre-reboot trusted computing base process module 302 may collect a user credential from the user. The pre-reboot trusted computing base process module 302 may instruct a local security authority module 304 to prepare an ephemeral entropy to substitute for the user credential. The pre-reboot trusted computing base process module 302 may provide the user credential to the local security authority module 304.

For a network resource, the local security authority module 304 may provide the user credential to a network authentication package 306 to acquire a data protection key for that network resource from an encrypted logon cache 308. The network authentication package 306 may use the user credential to decrypt a data protection key. The network authentication package 306 may use the data protection key to decrypt resource access information to allow the user device to access the network resource. The network authentication package 306 may generate an ephemeral entropy to encrypt the data protection key. The ephemeral entropy may be a single use password or secret key used to encrypt the data protection key. The network authentication package 306 may store the ephemeral entropy in a secure location.

For a device resource, the local security authority module 304 may provide the user credential to a device authentication package 310 to acquire a data protection key for that device resource from an encrypted logon cache 308. The device authentication package 310 may use the user credential to decrypt a data protection key. The device authentication package 310 may use the data protection key to decrypt resource access information to allow the user device to access the device resource. The device authentication package 310 may generate an ephemeral entropy to encrypt the data protection key. The device authentication package 310 may store the ephemeral entropy in a secure location.

After a reboot, the user device may execute a post-reboot trusted computing base process module 312. The post-reboot trusted computing base process module 312 may instruct the local security authority module 304 to reestablish access to the user resource. The local security authority module 304 may retrieve the ephemeral entropy to decrypt the data protection key. The network authentication package 306 or the device authentication package 310 may use the data protection key to reestablish access to the network resource. The device authentication package 310 may use the data protection key to reestablish access to the device resource.

Figure 4:
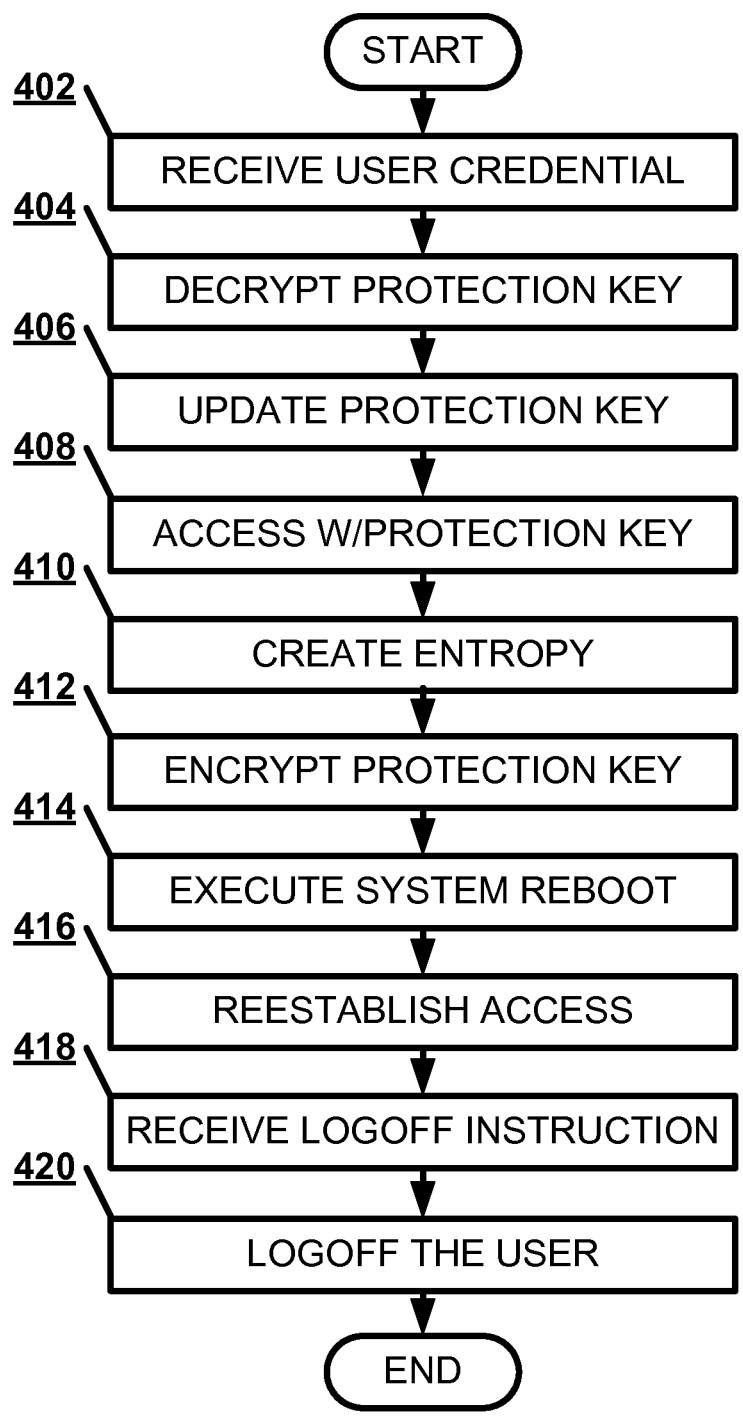
FIG. 4 illustrates, in a flowchart, one embodiment of a method for accessing a user resource with a user credential.

FIG. 4 illustrates, in a flowchart, one embodiment of a method 400 for accessing a user resource with a user credential. The user device may receive a user credential from the user during an initial login to access a user resource (Block 402). The user device may decrypt a credential-protected key to produce a data protection key (Block 404). The user device may update a data protection key (Block 406). The user device may access the user resource with the data protection key (Block 408). The user device may create an ephemeral entropy to access the user resource with the data protection key (Block 410). The user device may encrypt the data protection key with a user credential to produce a credential-protected key (Block 412). The user device may execute a system reboot (Block 414). The user device may reestablish access to the user resource while forgoing use of the user credential (Block 416). The user device may receive a logoff instruction from the user (Block 418). The user device may logoff the user (Block 420).

Figure 5:
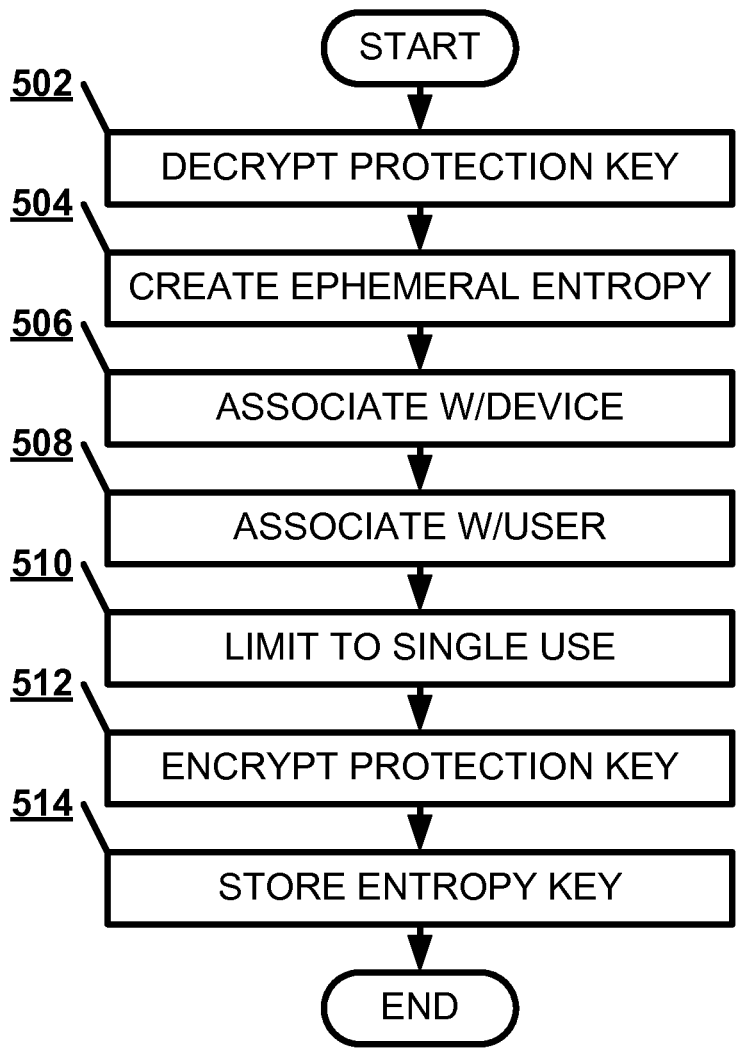
FIG. 5 illustrates, in a flowchart, one embodiment of a method for creating an entropy-protected key.

FIG. 5 illustrates, in a flowchart, one embodiment of a method 500 for creating an entropy-protected key. The user device may decrypt a credential-protected key to produce a data protection key (Block 502). The user device may create an ephemeral entropy to access a user resource with the data protection key (Block 504). The user device may associate exclusively an ephemeral entropy to the user device (Block 506). The user device may associate exclusively an ephemeral entropy to a user of the user device (Block 508). The user device may limit the ephemeral entropy to a single use (Block 510). The user device may encrypt the data protection key with the ephemeral entropy to produce an entropy-protected key (Block 512). The user device may store an entropy-protected key in a secure location (Block 514).

Figure 6:
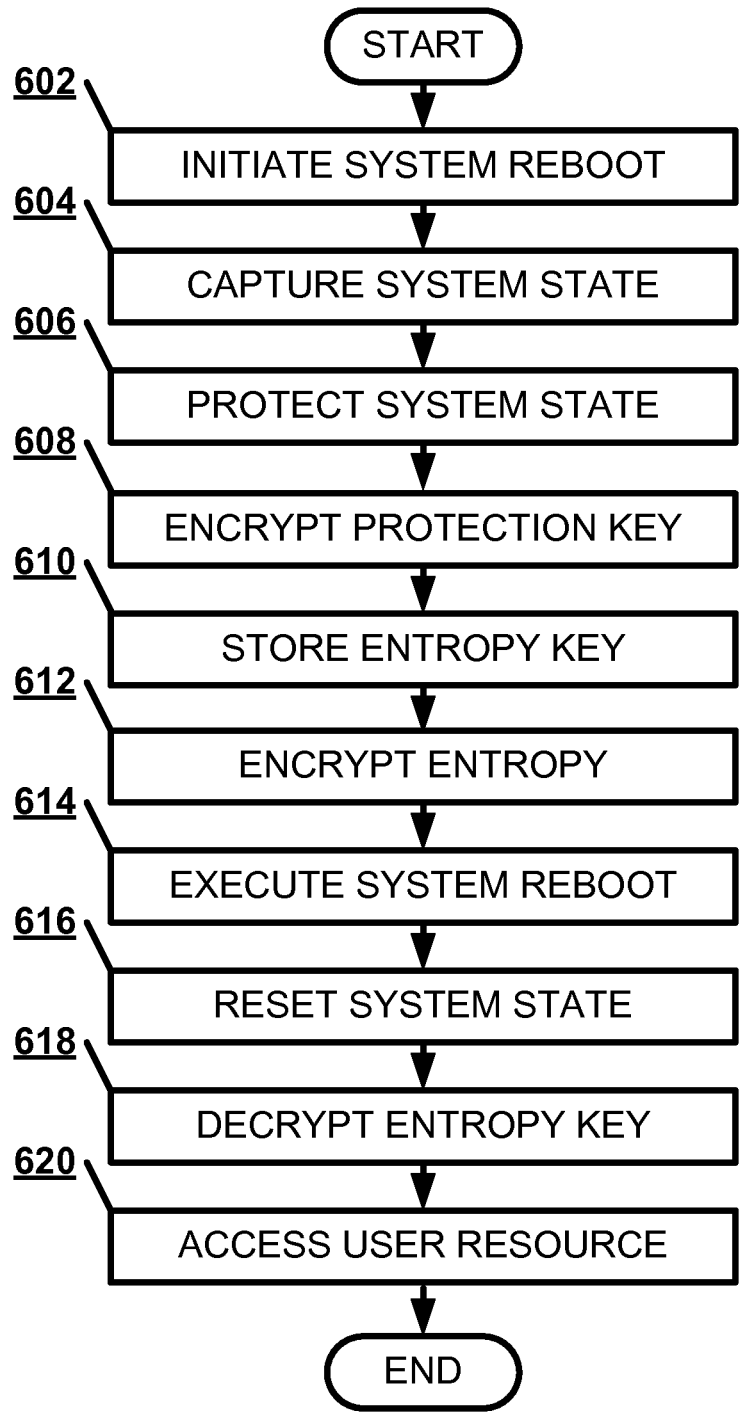
FIG. 6 illustrates, in a flowchart, one embodiment of a method for executing a system reboot with an ephemeral entropy.

FIG. 6 illustrates, in a flowchart, one embodiment of a method 600 for executing a system reboot with an ephemeral entropy. The user device may initiate a system reboot (Block 602). The user device may capture a system state for the user device prior to the system reboot (Block 604). The user device may protect the system state for the user device with a data protection key (Block 606). The user device may encrypt the data protection key with the ephemeral entropy to a produce an entropy-protected key (Block 608). The user device may store the entropy-protected key in a secure location (Block 610). The user device may encrypt the ephemeral entropy, possibly through the use of full disk encryption, to protect the ephemeral entropy while the device is offline (Block 612). The user device may execute a system reboot (Block 614). The user device may reset a system state for the user device upon a system reboot (Block 616). The user device may decrypt the entropy-protected key after a system reboot to produce the data protection key (Block 618). The user device may access the user resource with a data protection key (Block 620).

Figure 7:
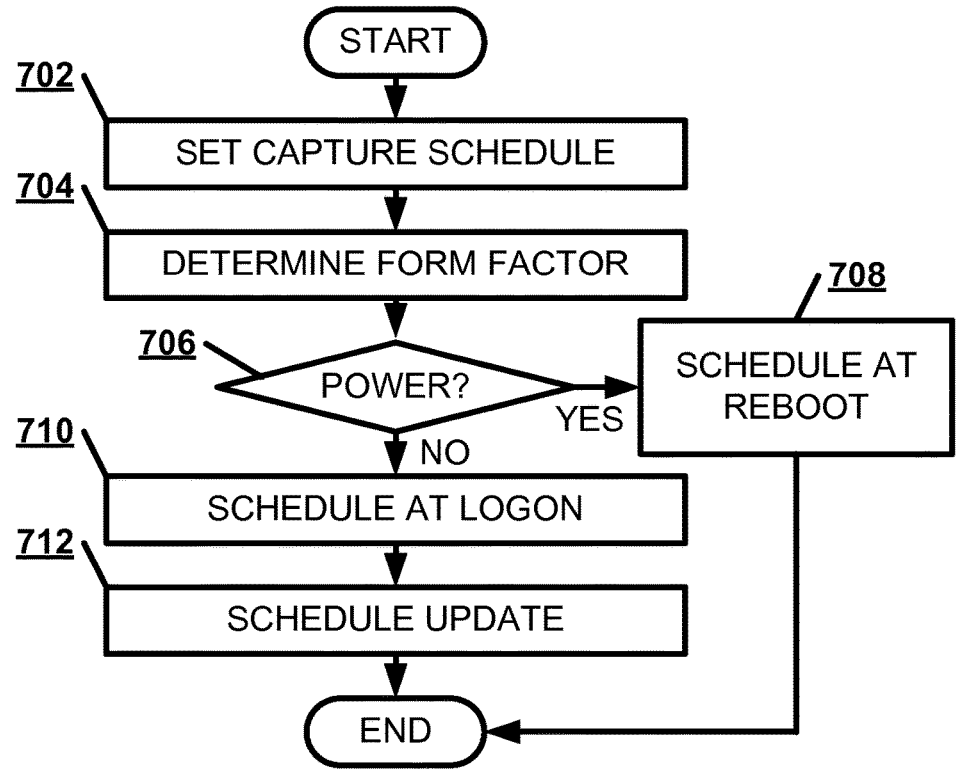
FIG. 7 illustrates, in a flowchart, one embodiment of a method for scheduling the capture of a system state.

The user device may schedule encryption of the system state of the user device based on the form factor of the user device. For example, a mobile device that may power off unexpectedly due to battery issues may capture a system state at logon. The mobile device may update the system state upon initiating a reboot. Alternately, a desktop that has a constant supply of power may conserve resources by waiting until a reboot is initiated. FIG. 7 illustrates, in a flowchart, one embodiment of a method 700 for scheduling the capture of a system state of the user device. The user device may set a capture schedule for capturing a system state based on a device form factor (Block 702). The user device may determine the device form factor (Block 704). If the user device is a stationary device or a mobile device with a stable continuous power source (Block 706), the user device may schedule creating the capture of the system state at a system reboot (Block 708). If the user device is a mobile device without a stable continuous power source (Block 706), the user device may schedule an initial capture of the system state at a user logon (Block 710). The user device may schedule an update of the system state at the system reboot (Block 712).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to store desired program code means in the form of computer-executable instructions or data structures, as opposed to propagating media such as a signal or carrier wave. Computer-readable storage media explicitly does not refer to such propagating media. Combinations of the above should also be included within the scope of the computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A user device, comprising:
a processing core having at least one processor configured to, before a system reboot:
decrypt a credential-protected key based on a user credential to generate a data protection key, wherein the user credential is received via an input device during an initial logon for a user to access a user resource;
create a random token generated to last for a limited period of time to act as an ephemeral entropy; and
encrypt the data protection key with the ephemeral entropy to produce an entropy-protected key; and
a non-volatile data storage device to store the entropy-protected key prior to the system reboot,
wherein the at least one processor is further configured to, based on the system reboot and after the system reboot, decrypt the entropy-protected key, stored in the non-volatile data storage, by using the ephemeral entropy to produce the data protection key, and access the user resource with the data protection key decrypted from the entropy-protected key after the system reboot without using a separate user credential from the data protection key decrypted using the ephemeral entropy.

2. The user device of claim 1, wherein the ephemeral entropy is associated exclusively with at least one of the user device and the user of the user device.

3. The user device of claim 1, wherein the ephemeral entropy is limited to a single use.

4. The user device of claim 1, wherein the processing core is further configured to set a capture schedule for a capture of a system state based on a device form factor.

5. The user device of claim 1, wherein the processing core is further configured to schedule capturing a system state of the user device during at least one of after a user logon and prior to the system reboot.

6. The user device of claim 1, wherein the data storage device configured to store a system state for the user device prior to the system reboot.

7. The user device of claim 1, wherein the processing core is further configured to protect a system state for the user device with the data protection key.

8. The user device of claim 1, wherein the processing core is further configured to reset a system state for the user device upon the system reboot.

9. The user device of claim 1, wherein the processing core is further configured to protect the user resource with the data protection key.

10. The user device of claim 1, wherein the user credential is at least one of a password, a biometric credential, and a pair of asymmetric keys.

11. The user device of claim 1, wherein the processing core is configured to encrypt the ephemeral entropy to protect the ephemeral entropy while the user device is offline.

12. The user device of claim 1, wherein the processing core is configured to decrypt the entropy-protected key with the ephemeral entropy to produce the data protection key.

13. The user device of claim 1, further comprising:
a secure data storage device configured to store the entropy-protected key in a secure location.

14. A computing device, comprising:
a processing core configured to encrypt a data protection key, based on a user credential received from a user during a login, to generate a credential-protected key, and
memory configured to store the user credential to access a user resource and the credential-protected key, wherein:
the processing core is configured to decrypt the credential-protected key to produce the data protection key,
the processing core is further configured to create a random token generated to last for limited period of time to act as an ephemeral entropy,
the processing core is also configured to encrypt the data protection key with the ephemeral entropy to produce an entropy-protected key and store the entropy-protected key in a non-volatile storage memory prior to a system reboot of the computing device,
the processing core is configured to additionally execute the system reboot of the computing device, and
the processing core is further configured to reestablish, based on the system reboot and after the system reboot, access to the user resource based on the data protection key, decrypted from the entropy-protected key by using the ephemeral entropy, without using a separate user credential from the data protection key decrypted using the ephemeral entropy.

15. The computing device of claim 14, wherein the processing core is also configured to schedule capturing a system state of the computing device prior to the system reboot.

16. The computing device of claim 14, wherein the processing core is also configured to decrypt the entropy-protected key to produce the data protection key.

17. The computing device of claim 14, wherein the processing core is also configured to reset a system state for the computing device upon the system reboot.

18. The computing device of claim 14, wherein the processing core is also configured to store the entropy-protected key in a secure location.

19. A machine-implemented method, comprising:
receiving in a user device a user credential from a user during an initial login to access a user resource;
decrypting a credential-protected key based on the user credential to produce a data protection key;
encrypting, prior to a system reboot, the data protection key with a random token generated to last for a limited period of time to act as an ephemeral entropy to produce an entropy-protected key;
decrypting, based on the system reboot and after the system reboot and by using the ephemeral entropy, the entropy-protected key to produce the data protection key; and
accessing, after the system reboot, the user resource with the data protection key decrypted from the entropy-protected key without using a separate user credential from the data protection key decrypted using the ephemeral entropy.

20. The method of claim 19, further comprising:
capturing a system state for the user device prior to the system reboot;
protecting the system state with the data protection key; and
resetting the system state upon the system reboot.

* * * * *